United States Patent [19]

Wiener

[11] Patent Number: 4,485,803
[45] Date of Patent: Dec. 4, 1984

[54] SOLAR RECEIVER WITH INTERSPERSED PANELS

[75] Inventor: Murray Wiener, Akron, Ohio

[73] Assignee: The Babcock & Wilcox Company, New Orleans, La.

[21] Appl. No.: 434,216

[22] Filed: Oct. 14, 1982

[51] Int. Cl.³ .................................................. F24J 3/02
[52] U.S. Cl. ..................................... 126/422; 126/438; 60/641.8
[58] Field of Search ............... 126/438, 442, 446, 447, 126/448, 422; 165/171, 178, 101; 60/641.8, 641.5

[56] References Cited

U.S. PATENT DOCUMENTS

| | | | |
|---|---|---|---|
| 3,924,604 | 12/1975 | Anderson | 126/438 X |
| 3,927,659 | 12/1975 | Blake et al. | 60/641.8 |
| 4,136,674 | 1/1979 | Korr | 126/443 |
| 4,245,618 | 1/1981 | Wiener | 126/438 |
| 4,289,114 | 9/1981 | Zadiraka | 60/641.8 |
| 4,320,663 | 3/1982 | Francia | 60/641.8 |
| 4,400,946 | 8/1983 | Oplatka | 60/641.8 |

Primary Examiner—Margaret A. Focarino
Attorney, Agent, or Firm—Robert J. Edwards; James C. Simmons

[57] ABSTRACT

A solar receiver comprising a plurality of vapor generating tube panels and a plurality of superheating tube panels interspersed with the vapor generating tube panels to maintain nearly a constant absorbed power ratio between the superheating and vapor generating tubes independently of heat flux distribution on the absorber surface.

21 Claims, 7 Drawing Figures

SOLAR RECEIVER WITH INTERSPERSED PANELS

FIELD AND BACKGROUND OF THE INVENTION

The present invention relates in general to solar energy collectors and more particularly to a new and useful solar receiver which comprises a plurality of panels of vapor generating tubes and a plurality of panels of superheater tubes interspersed with the panels of vapor generating tubes.

Significant effort has been directed in recent years toward the development of a solar receiver suitable for power generation. One of the more promising concepts is that of a solar power tower with a central receiver located on a tower. Sunshine falling on an array of computer guided tracking mirrors known as heliostats is reflected toward the receiver and the incident energy is absorbed by a heat transport fluid flowing in the receiver. The thermal energy in the fluid may be used to run a turbine generator or to provide heat for industrial use.

The absorber surface of a central solar receiver usually consists of tubular assemblies of various shapes and arrangements. Often, flat panels are used which are made up of parallel tubes that are welded to headers at each end.

Two basic configurations for these central receivers have been proposed and built, namely the external type and the cavity type. In general, external receivers are smaller, lighter, and less costly but have a lower thermal efficiency than cavity receivers. The external receiver may have one of several different shapes such as the shape of a multi-panel polyhedron approximating a cylinder or a part thereof. Examples of the external type are found in U.S. Pat. No. 4,136,674 to Korr; U.S. Pat. No. 4,289,114 to Zadiraka; and U.S. Pat. No. 4,245,618 to Wiener. U.S. Pat. No. 4,164,123 to Smith discloses a cavity type receiver.

Water or steam is a preferred working fluid for solar receivers because power plant operators are familiar with water/steam equipment. Water or steam receivers are actually steam generators operating on solar energy. A steam generator consists usually of three major parts connected in series: a preheater comprised of a group of economizer tubes; an evaporator comprised of a group of steam generating tubes; and a superheater. Steam generators are discussed in *Steam, its Generation and Use*, 39th Ed., The Babcock and Wilcox Company, 1978.

In a steam generator that delivers steam to a turbine, it is important to maintain a constant steam temperature and pressure within close limits even when the power varies. In a conventional steam generator, the heat of the combustion gases at any load is usually provided proportionately to all of the tubes of the three major parts (preheater, evaporator and superheater) so the proportion of heat absorbed by each part remains essentially constant. Although steam generation techniques are generally well known, solar receivers operate in an environment which is different from that of fossil or nuclear steam generators. A solar receiver is exposed to daily cycling from zero to peak power with a multitude of fast variations in heat distribution due to cloud transients.

In known solar receiver designs, the panels of tubes are arranged at fixed locations on the receiver, the locations being based on clear day insolation conditions. When, during a cloud transient, the heliostat field is partially shaded, the heat distribution to the tube panels becomes unbalanced resulting in loss of control of the steam temperatures from the superheater tube panels. Because of the decreased power input to the receiver from insolation, steam generation is reduced but the heat flux from insolation at some receiver areas may remain high. If high heat flux onto some superheater tubes coincides with high steam temperature due to reduced steam flow therein, the superheater tube metals will become overheated and overstressed resulting eventually in tube failure.

The prior art has sought to alleviate the problems discussed above, at the expense of high pressure losses and less efficient steam generation, by such means as requiring extremely high fluid flows through all of the tubes to compensate for random high heat flux in some of them, increasing the size of the solar receiver, or defocusing most of the bright heliostats from the receiver resulting in little power generation during the transient conditions.

If steam generating tubes are positioned in front of superheating tube panels to act as screen tubes, a greater number of superheating tubes are required for the same amount of power output since the superheating tubes will be partially shaded. In order to allow insolation to be received by the superheating tube panels, the screen tubes are not membraned. Since membrane members as well as the tubes absorb insolation, the use of membrane members with the steam generating tubes as well as with the superheating tubes reduces the number of steam generating tubes that are required for the same power output. In addition, a conventional buckstay arrangement cannot be provided to maintain appropriate intertube spacing and inhibit vibration of the screen tubes since such an arrangement would be undesirably exposed to the insolation. Support bars may be welded to individual screen tubes respectively which bars extend through slots in webs of the corresponding superheating tube panels for attachment to a complex and expensive vibration support structure in back of the superheating tube panels which structure is in turn attached to the webs. However, such a structure is more expensive than a buckstay arrangement, and it is more desirable to provide an arrangement of the tubes to alleviate the insolation exposure problems and whereby a less expensive buckstay arrangement can be used to maintain panel shape and facilitate erection of the panels in a receiver having a minimum number of tubes for the same power output.

SUMMARY OF THE INVENTION

An object of the present invention is to avoid the difficulties mentioned above while eliminating the economically unattractive alternatives of the prior art in order to provide a significant advantage for reliable receiver operation. The invention utilizes the interspersing of superheater tube panels among vapor generating and/or preheater tube panels for the object of maintaining nearly a constant absorbed power ratio between the superheater and vapor generating tubes independently of heat flux distribution on the absorber surface. In other words, the tube panels are interspersed for the purpose of causing any shift of the heat flux pattern which is incident on the receiver due to diurnal, seasonal, or cloud shadowing effects to affect the steam generation and the superheating parts of the receiver to the same degree and thereby facilitate temperature control of the steam leaving the receiver for reliable receiver operation even during days with partial cloud cover.

It is another object of the present invention to provide proper flow distribution during severe cloud transients as well as during start up to maintain exit steam temperature from each superheater tube panel within allowable limits.

It is still another object of the present invention to arrange the components of a solar receiver so as to assure the greatest heat transfer while preventing overheating of the tubes in the highest heat flux zones during the various conditions to which a receiver is normally subjected.

It is another object of the present invention to dispose the steam generating and superheating tube panels so as to simplify the support structure for both the steam generating and superheating tube panels.

It is yet another object of the present invention to provide a solar receiver which is simple in design, rugged in construction, economical to manufacture, and economical to operate.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DESCRIPTION OF THE PREFERRED EMBODIMENT

Figure 1:
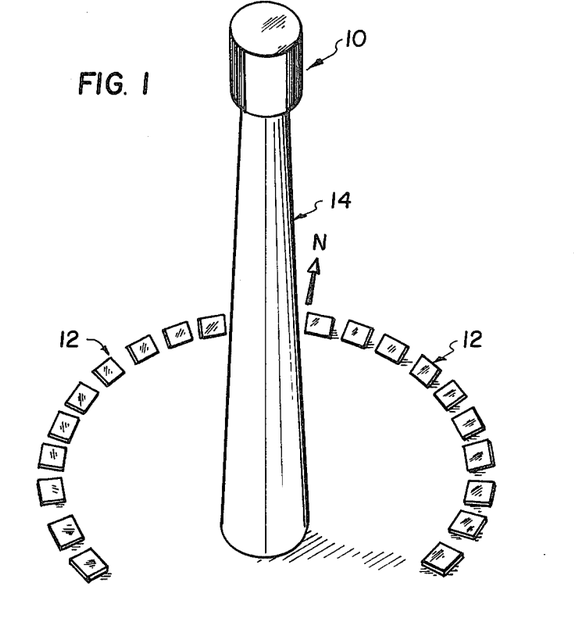
FIG. 1 is a schematic view of a solar receiver embodying the invention and disposed on top of a tower which is partly surrounded by a heliostat field.

Referring to the drawings, there is shown in FIG. 1 a solar receiver 10 made up of a plurality of steam generating and superheater tubes which are distributed, in accordance with a preferred embodiment of the present invention, in a generally cylindrical pattern and around at least a portion of the cylindrical pattern for receiving solar radiation energy from a plurality of directions respectively, in this case from the various reflecting members of the heliostat field generally illustrated at 12. The receiver 10 is located on top of a tower 14 so as to be above the heliostat field 12. It should be noted that the tower 14 is not located at the center of the heliostat field 12. In the Northern hemisphere, the most efficient use of the heliostat field 12 is obtained by locating the tower 14 southward of the center of the field 12, as illustrated in FIG. 1. This provides a circumferential nonuniform solar heat flux to the tubes. The highest heat flux is provided to the tubes located on the north side of the receiver 10. The solar heat energy absorbed by each tube will vary according to the diurnal and seasonal variations of insolation and will also depend on cloud shadowing. It should be recognized that the location of tower 14 for a like installation in the southern hemisphere will be northward of the center of the heliostat field 12 with the highest heat flux being provided to the tubes located on the south side of the receiver 10.

Figures 2, 4:
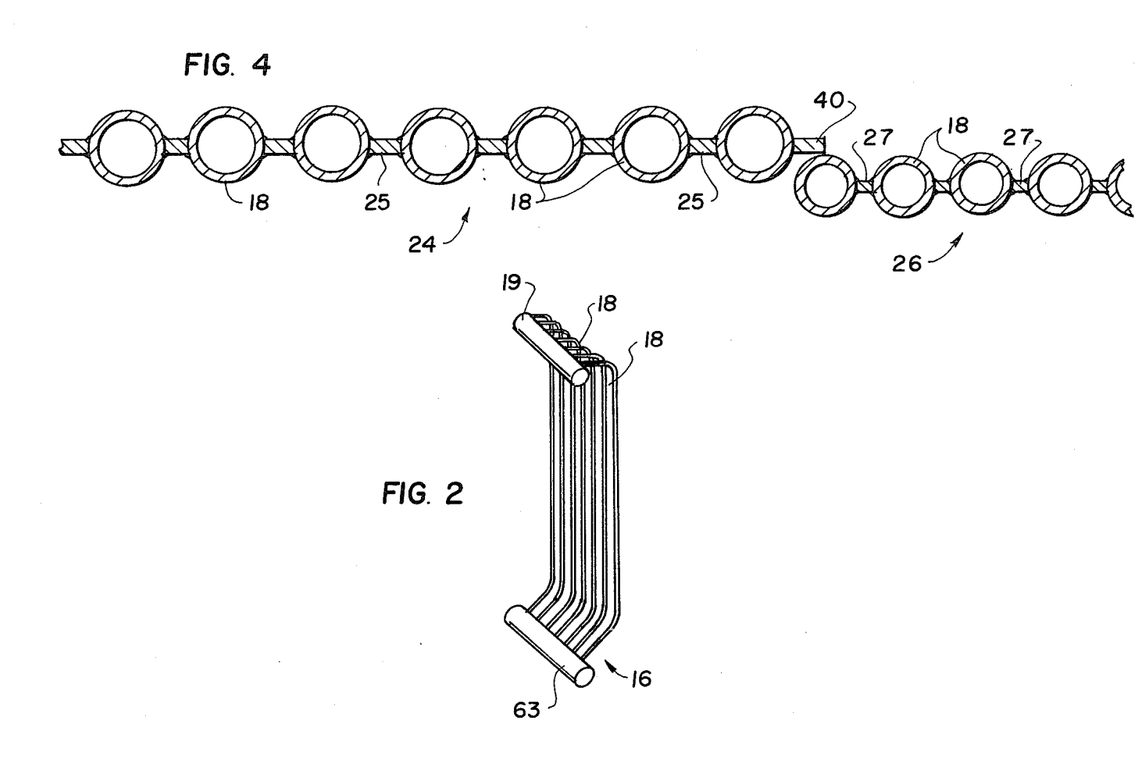
FIG. 2 is a perspective schematic view of a tube panel for the solar receiver.
FIG. 4 is a horizontal sectional view taken through a portion of one steam generating tube panel and a portion of one superheater tube panel in accordance with the invention.
Figure 3:
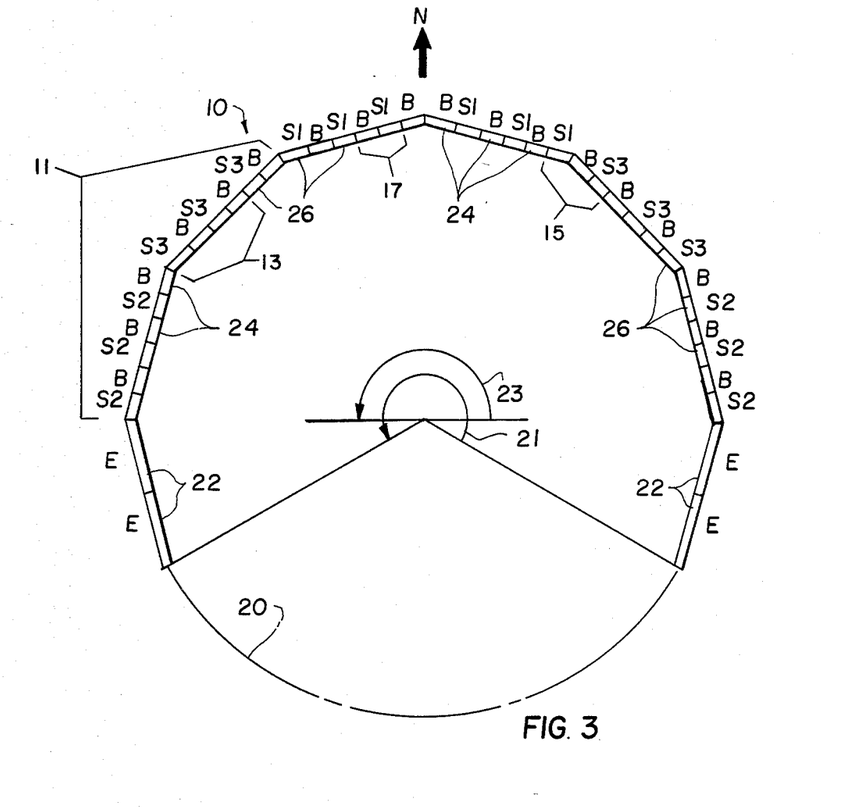
FIG. 3 is a horizontal sectional view of a panel arrangement according to the invention.

FIG. 3 shows schematically, in a plan sectional view, an arrangement of panels of tubes for the solar receiver 10 to generate up to 300,000 lb/hr steam at 1600 psi pressure and 1000° F. A panel of tubes is schematically illustrated at 16 in FIG. 2. A panel of tubes for a solar receiver is typically comprised of two or more parallel tubes 18 rigidly joined and each of which is in flow communication with a common flow path or inlet header 63 and a common outlet header 19. For the purposes of this specification and the claims, a panel of tubes is defined as a group of two or more adjacent tubes joined to a common fluid inlet. The tubes 18 are illustrated as being bent so that the headers 19 and 63 may be positioned so that they are not excessively exposed to the heat flux. However if suitable, less costly straight tubes may be used.

The absorber tube panels illustrated at 22, 24, and 26 in FIG. 3 are arranged on eight sides generally facing north for the Northern hemisphere, as illustrated in FIG. 3, or south for the Southern hemisphere, of a 12 sided regular vertical prism covering an arc, illustrated at 21, of 240 degrees of a 42 ft. diameter circumscribed cylinder 20. Thus, the panels 22, 24, and 26 are distributed to form the pattern of a generally cylindrical portion having an arc 21 of 240 degrees. Although the tubes of a panel may extend horizontally, the tubes 18 preferably extend generally vertically; that is, they form an angle with the ground of at least about 75 degrees.

A typical graph of the amount of power (insolation) delivered to the receiver panels at various points along the circumference of the cylindrical portion has a shape resembling a sine curve, with little power at the outbound edges and a peak near the receiver center at the north axis (for the Northern hemisphere). The preheater or economizer tube panels 22 are preferably located on the two outboard sides where the absorption per tube is small and varies drastically. The other six sides, which form the pattern of a generally cylindrical portion having an arc, illustrated at 23, of about 180 degrees, are covered with eighteen superheater tube panels 26 and eighteen evaporator or steam generating tube panels 24. For ease of understanding, the economizer tube panels 22 making up the economizer are labelled E, the steam generating tube panels 24 are labelled B, and the superheater tube panels 26 are labelled S. The numerals 1, 2, and 3 designate primary, intermediate, and secondary superheater tube panels respectively. Thus, the designation in this specification of S1 would refer to a primary superheater tube panel.

Although the tube panels are illustrated as being arranged in a generally cylindrical pattern in accordance with a preferred embodiment of this invention, it should be understood that this invention is not limited to such an arrangement. The tube panels may be arranged in accordance with this invention in any suitable pattern such as, for example, concave, convex, omega-shaped, or straight. When the panels are disposed in a straight pattern, the problems addressed by the present invention may still exist. In such a case, the heliostat mirrors may direct the solar radiation onto the receiver panels at an incident angle less than 90 degrees. For this reason and/or as a result of various transient conditions, there may be greater heat flux at the center of the straight pattern of panels or the heat flux may be otherwise unevenly distributed to the panels.

If such uneven heat flux distribution to the receiver 10 results in disproportionate heat flux distributions to the superheating tube panels and the vapor generating tube panels, then tube overheating and failure or undesirable variations in superheater steam outlet temperatures may occur for the reasons previously described. In order to provide a nearly constant absorbed power ratio between the superheating and vapor generating parts of the receiver at any indicent heat flux pattern caused by random, partial cloud cover or other transient conditions, in accordance with the present invention, the vapor generating and superheating tube panels 24 and 26 respectively are disposed in side-by-side relationship for receiving solar radiation energy, and the superheating tube panels 26 are interspersed with the vapor generating tube panels 24 over a sequence, illustrated at 11 in FIG. 3, of at least twelve panels (preferably twenty-four panels, and more preferably all of the panels; that is, all thirty-six panels 24 and 26 of the receiver embodiment shown in FIG. 3) such that each sequence, illustrated at 13 in FIG. 3, of four panels therein comprises at least one superheating tube panel 26 and at least one vapor generating tube panel 24. More preferably, each sequence, illustrated at 15 in FIG. 3, of three panels comprises at least one superheating tube panel 26 and at least one vapor generating tube panel 24. In accordance with a preferred embodiment of this invention illustrated in FIG. 3, substantially every sequence of two panels comprises at least one superheating tube panel 26 and at least one vapor generating tube panel 24. By "substantially every sequence" is meant every sequence with the exception of not more than one such sequence. For example, every sequence of two tube panels of the receiver illustrated in FIG. 3 comprises at least one superheating tube panel and at least one vapor generating tube panel with the exception of the sequence of two adjacent tube panels at the center of the length of arc 23. Inotherwords, the tube panels are disposed to preferably alternate substantially throughout the length of the pattern between a superheating tube panel 26 and a vapor generating tube panel 24 to most closely approach a constant absorbed power ratio between the superheating and the vapor generating parts of the receiver at any incident heat flux pattern.

In accordance with a preferred embodiment of the present invention wherein the tube panels are disposed in a generally cylindrical pattern having an arc 23 of at least 135 degrees, at least one superheating tube panel 26 and at least one vapor generating tube panel 24 are located in each 45 degrees (more preferably, each 15 degrees) of arc of the generally cylindrical pattern, as illustrated in FIG. 3.

In accordance with a preferred embodiment of this invention, each of the superheating and vapor generating tube panels 26 and 24 respectively are narrow panels; that is, a superheating tube panel 26 contains less than one-fifth (more preferably, less than one-tenth) of the superheating tubes, and a vapor generating tube panel 24 contains less than one-fifth (more preferably, less than one-tenth) of the vapor generating tubes in order to provide more even distribution of the tubes in accordance with the present invention.

The particular sizes and compositions of the tubes and panels can be determined utilizing engineering principles of common knowledge to those of ordinary skill in the art to which this invention pertains. Referring to FIG. 4, in the embodiment shown, each vapor generating tube panel 24 is composed of fourteen tubes 18 of 1.25 in. outside diameter steel (ASME material specification SA-213 Grade T2). Disposition of the tube panels in side-by-side relationship rather than the vapor generating tubes being disposed in front of the superheating tube panels permits both the superheating and vapor generating tube panels 26 and 24 respectively to be advantageously provided with webs such as membrane members between the tubes thereof. Therefore, membrane members 25 are preferably welded between and along the length of each pair of adjacent tubes of each panel 24 (on 1.75 in. centers to provide a panel width of 24 in.) to provide structural support of the tubes, to aid in shipment and assembly, and to absorb additional insolation for more efficient receiver operation. A 0.5 in. wide membrane bar 40 is welded along the length of each edge tube (resulting in an overall panel width of 25.0 in.) to act as a radiation shield at the junction with another panel so that little or no radiation will penetrate past the absorbing surface. Although the tube panels 24 and 26 are disposed in side-by-side relationship, tube panel 26 is slightly ahead of (by about the radius of a tube) tube panel 24, and the first tube of the tube panel 26 is ahead of membrane bar 40 and spaced from the first tube of tube panel 24 a distance sufficient to permit horizontal expansion of the tube panels. Each superheater tube panel 26 is composed of fifteen tubes 18 of alloy 800H (ASME material specification SB163) and has a 1.0 in. outside diameter and 0.1 in. thickness with membrane members 27 preferably welded between and along the length of each pair of adjacent tubes on 1.281 in. centers to provide an overall superheater panel width of about 18.93 in. Each economizer tube panel 22 is composed of 1.25 in. outside diameter carbon steel tubes with similar membrane members welded between adjacent tubes on 1.75 in. centers. The panels including the tubes and membrane members are preferably provided with a suitable non-reflective heat absorbing surface such as may be provided by black paint. However, it should be understood that the various tube sizes, compositions, numbers, and the like are merely illustrative of the present invention, and the scope of the present invention is not meant to be limited thereto.

Referring to FIG. 3, each side of the prism circumscribed by arc 23 is composed of three superheater tube panels 26 and three vapor generating tube panels 24. In accordance with a preferred embodiment of this invention, these panels are attached to a panel support means such as a horizontal and vertical buckstay system, shown in FIG. 5, which forms a backup structure for maintaining panel shape and facilitating erection. All panels are supported from their upper headers 19 which are attached to the buckstay system. The panels are free to expand downwards and sidewards. Vertical buckstays 30 are rigidly attached to a receiver support structure (not shown) at the top of the tower 14. Horizontal buckstays 32 are rigidly connected to three vapor generating tube panels 24 and move with the vapor generating tubes as they expand due to heating. The horizontal buckstays 32 are connected to the vertical buckstays 30 by means of clips 34 which hold the horizontal buckstays 32 against the vertical buckstays 30 but which permit the horizontal buckstays 32 to slide along the flanges of the vertical buckstays to permit unrestricted vertical expansion and contraction of the steam generating tubes relative to the buckstays. The buckstays are in back of the panels; that is, they are on the opposite side of the panels from the insolation receiving surfaces and thus not in the path of insolation for the panels. Therefore, the buckstays remain relatively cold. Although only one clip 34 is shown holding the lower portion of horizontal buckstay 32, other such clips 34 are provided along the length of the buckstay 32 including clips holding the upper portion thereof.

Figure 5:
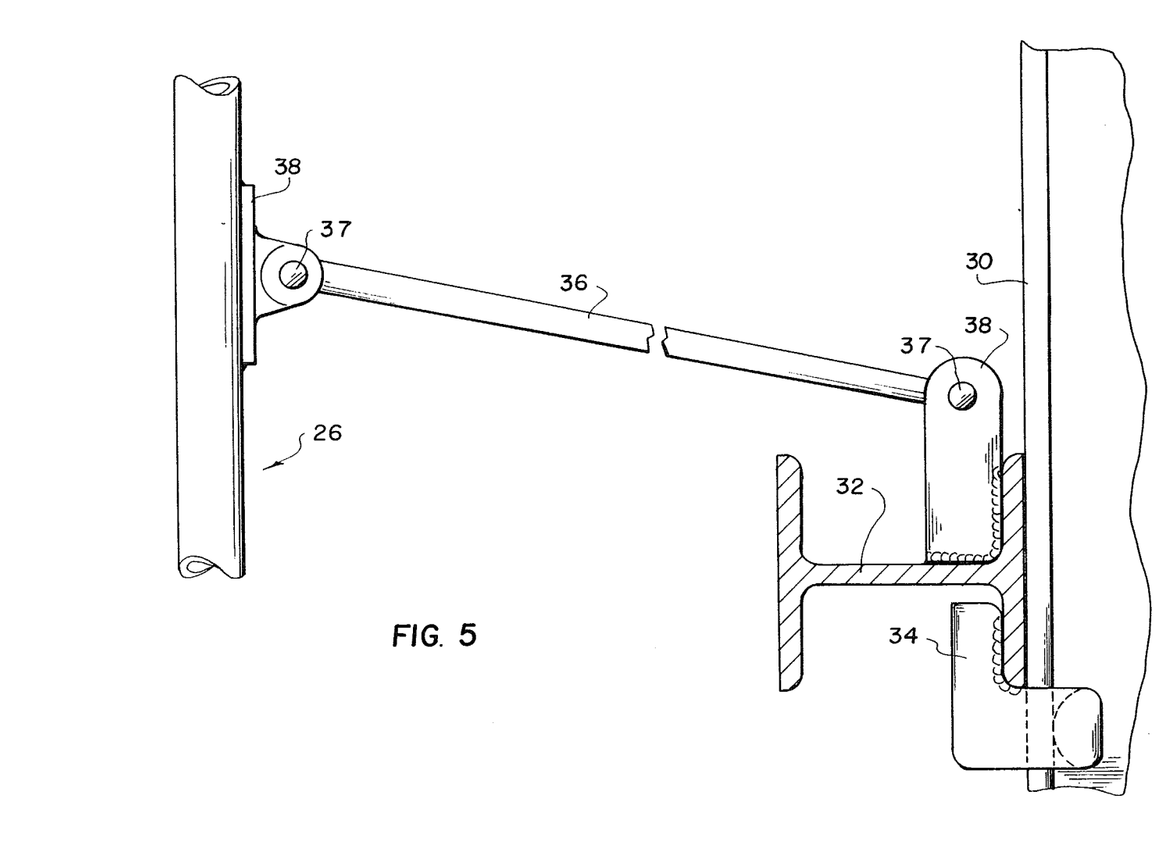
FIG. 5 is a side elevational view of a buckstay assembly for mounting the tube panels.

The superheater tube panels 26 will expand in a direction along the tube length considerably more than the vapor generating tube panels 24 will expand. In order to accommodate for this differential expansion, each superheater tube panel 26 is connected to a respective horizontal buckstay 32 by means of a clevis link 36, connected by means of pins 37 between respective tie bars 38 on the corresponding panel and on the corresponding horizontal buckstay wherein pins 37 allow vertical movement of the superheater tube panels relative to the horizontal buckstays and therefore relative to the vapor generating tube panels 24.

Figure 6:
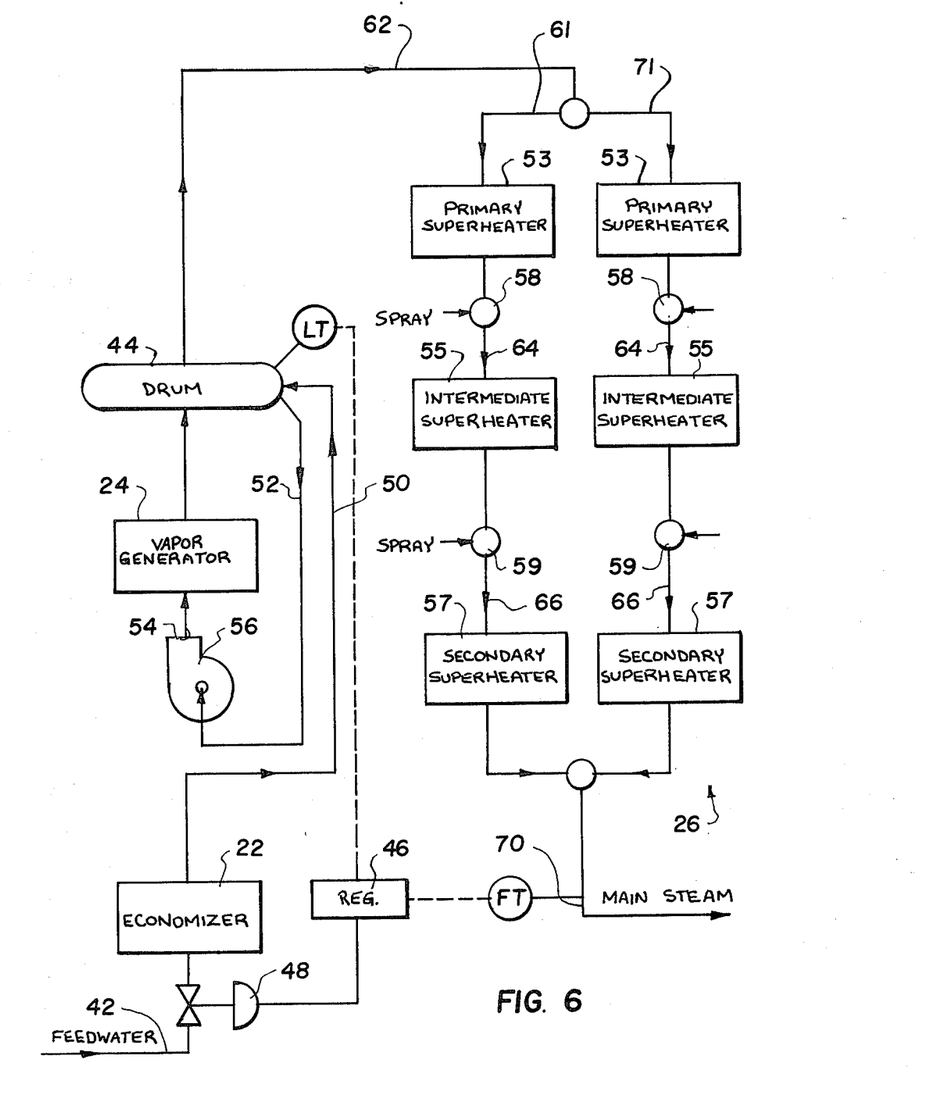
FIG. 6 is a schematic diagram showing a flow sequence in accordance with the invention.
Figure 7:
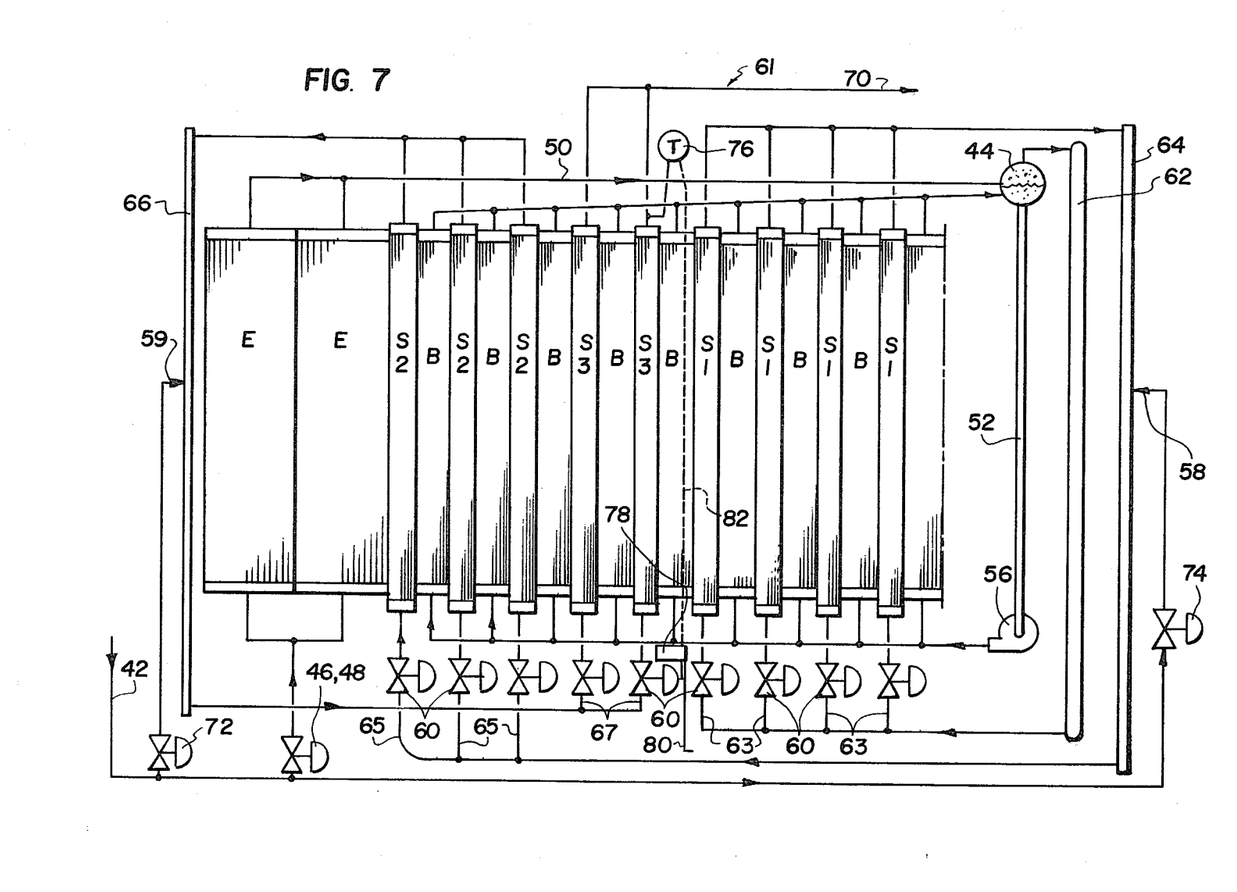
FIG. 7 is another schematic showing flow through the solar receiver in accordance with the invention.

The flow sequence through the solar receiver 10 is illustrated in FIGS. 6 and 7. Feedwater is introduced through line 42 into the economizer tube panels 22 where it is preheated and then injected into a steam and water drum 44. The flow of the feedwater through flow valve 48 to the receiver 10 is controlled by a conventional three-element feedwater regulator 46 which is responsive to drum level and steam flow signals. The water is preheated in the economizer panels 22 and is injected through line 50 into the drum 44 where it is mixed with saturated water discharged from cyclone separators or other suitable steam-water separators in the drum. Slightly subcooled water flows from the drum 44 through an external downcomer 52 after which it is pumped through lines 54 into the steam generating tube panels 24 by pump 56 wherein insolation onto the steam generating tube panels 24 supplies thermal energy to the water. The resulting steam-water mixture passes into the steam drum 44 where the water and steam are separated in a conventional manner in the steam-water separators and the water is again mixed with incoming water from the economizer tube panels 22 and again flows through the downcomer line 52 to the pump 56. Pump 56 may be any suitable pump such as, for example, a glandless, wet motor, circulating pump.

The superheater is divided into two symmetrical flow paths 61 and 71 for the east and west portions of the receiver respectively so that the flow to the respective east and west superheating tube panels may be controlled individually for morning and afternoon insolation conditions respectively. Each flow path consists of three upflow series passes with spray attemperators illustrated at 58 and 59 provided between the passes. The two flow paths and the spray attemperation are provided to compensate for large diurnal, seasonal, and cloud-induced variations of incident power on the west and east sides of the receiver. Each first pass or primary superheater 53 is composed of four superheater tube panels S1 whose flow paths are in parallel, and whose panels are located about mid-length of the arc 23, shown in FIG. 3, of the receiver. Each second pass or intermediate superheater 55 is composed of three superheater tube panels S2 whose flow paths are in parallel and whose panels are located near the respective east or west edge of the arc 23 shown in FIG. 3. Each third pass or secondary superheater 57 is composed of two superheater tube panels S3 whose flow paths are in parallel and which are positioned on the arc 23, shown in FIG. 3, between the primary and intermediate superheater passes.

FIG. 7 shows a schematic flow diagram of the east flow path 61 of the receiver, the west flow path 71 being similar thereto and mirror symmetric. After separation from water in the drum 44, steam flows through a single steam downcomer 62 afterwhich it is routed into the four parallel flow paths 63 for delivery to the respective primary superheater tube panels S1. The steam leaving the primary superheater is led through steam downcomer 64 afterwhich it is routed into the three parallel flow paths 65 for delivery to the respective tube panels S2.

The output from the intermediate superheater tube panels S2 is led through downcomer 66 afterwhich it is routed into the two parallel flow paths 67 for delivery to the respective secondary superheater tube panels S3 where it is heated to the final steam temperature at the required pressure. The attemperators 58 and 59 having flow regulators 74 and 72 respectively are located in respective steam downcomers 64 and 66 to aid in controlling final steam temperatures in a manner commonly known to those of ordinary skill in the art to which this invention pertains. The superheated steam from the secondary superheater tube panels S3 is discharged to main steam line 70.

Referring again to FIG. 3, various cloud transients and the like will result in varying distributions of solar insolation to the various superheater tube panels S1, S2, and S3 at various times over the course of a day. Such a transient may also result in reduced overall power input (insolation) to the receiver tubes thereby resulting in reduced production of steam in the steam generating tubes and drum and thus less overall flow of steam through the superheating tube panels. However, the heat flux (insolation) on some superheater tube panels may remain high in which case the steam flow through those particular tube panels, if not otherwise increased, may be insufficient to prevent the tubes thereof from becoming overheated and failing. Referring again to FIG. 7, means such as flow bias or butterfly control valves, illustrated at 60, for regulating vapor flow to each panel 26 of superheating tubes are provided in accordance with the present invention in order to prevent such overheating and failure of tubes from occurring while maximizing the overall steam generation for more efficient utilization of the receiver 10. A valve 60 is preferably provided in each of the parallel flow paths to the individual tube panels. Inotherwords, in the east flow path shown in FIG. 7, nine such valves 60 are provided for the nine individual flow paths 63, 65, and 67 respectively. As illustrated for one of the flow paths or headers 63 in FIG. 2, the steam flow in an individual flow path is then directed into the tubes of the respective individual tube panel. Valves 60 are each responsive to the outlet steam temperature of a respective tube panel. Outlet steam temperature input to each valve 60 may be provided by means such as temperature sensor 76 which is connected thereto by a suitable regulator illustrated at 78 and line 82. Although a temperature sensor 76 and regulator 78 is illustrated in FIG. 7 for only one of the nine valve 60 for purposes of clarity of the drawing, it should be understood that a similar arrangement is preferably provided for each of the other valves 60. These valves 60 may be used also as means for controlling steam flow into the two flow paths 61 and 71 to compensate for insolation differences between the east and west sides of the receiver during morning and afternoon conditions. However, if desired, a separate control valve for each flow path may be provided.

In accordance with a preferred embodiment of this invention, the valves 60 are set to remain about 70 percent open during normal clear day insolation. If, during a transient condition, a particular superheating tube panel outlet steam temperature exceeds an allowable value, a signal from the respective temperature sensor 76 to the respective valve control 78 effects repositioning of the respective valve 60 to increase the steam flow to the respective superheater tube panel S1, S2, or S3. If a tube panel outlet steam temperature is below a desired level, the respective valve 60 is throttled to divert the steam flow to other flow paths and panels for more efficient receiver operation. In a situation where a particular valve 60 is fully open and the steam outlet temperature for the respective tube panel is still above the allowable level, means are provided such as by a signal through line 80 from the respective valve control to the heliostat field control to redirect or stow the respective group of heliostats away from the hot insolation path to the respective tube panel. This superheater steam temperature control can be achieved alone or in conjunction with the control of attemperator flow valves 74 and 72 which spray water from the water line 42 into respective attemperators 58 and 59, utilizing engineering principles which are of common knowledge to those of ordinary skill in the art to which this invention pertains, to reduce the temperature of steam entering the intermediate and secondary superheater stages respectively.

Certain features of this invention may sometimes be used to advantage without a corresponding use of the other features. While a specific embodiment of the invention has been shown and described in detail to illustrate the application of the principles of the invention, it will be understood that the invention may be embodied otherwise without departing from such principles. For example, suitable fluids other than water and steam may be utilized in the receiver 10 for providing thermal energy, and the panels may be distributed in various suitable patterns other than cylindrical. In addition, the various numbers of flow passes, flow paths, tube panels, tubes per panel, and the like are merely illustrative of the preferred embodiments of this invention and the scope of this invention is meant to cover greater and lesser numbers thereof.

What is claimed is:

1. A solar receiver for receiving solar radiation energy comprising a plurality of panels of vapor generating tubes for receiving a flow of liquid to be heated to generate a vapor which generated vapor is mixed with the liquid, means for separating the vapor from the liquid, and a plurality of panels of superheating tubes for receiving a flow of the vapor to superheat the vapor, said vapor generating tube panels include outlet means flow connected to said separating means for discharging the generated vapor to said separating means, said superheating tube panels include inlet means flow connected to said separating means for receiving the generated vapor from said separating means, said vapor generating tube panels and said superheating tube panels are disposed in side-by-side relationship for receiving solar radiation energy, and said superheating tube panels are interspersed with said vapor generating tube panels over a sequence of at least twelve panels such that each sequence of four panels in said sequence of at least twelve panels comprises at least one superheating tube panel and at least one vapor generating tube panel.

2. A solar receiver as in claim 1 wherein said superheating tube panels are interspersed with said vapor generating tube panels such that each sequence of three panels in said sequence of at least twelve panels comprises at least one superheating tube panel and at least one vapor generating tube panel.

3. A solar receiver as in claim 1 wherein said superheating tube panels are interspersed with said vapor generating tube panels over a sequence of at least twenty-four panels, and said superheating tube panels are interspersed with said vapor generating tube panels such that each sequence of three panels in said sequence of at least twenty-four panels comprises at least one superheating tube panel and at least one vapor generating tube panel.

4. A solar receiver as in claim 1 further comprising a plurality of means for regulating vapor flow to said superheating tube panels, each said vapor flow regulating means responsive to the outlet vapor temperature of an individual one of said superheating tube panels to regulate vapor flow to said individual superheating tube panel.

5. A solar receiver as in claim 1 wherein said superheating tube panels are interspersed with said vapor generating tube panels over a sequence of at least twenty-four panels, and wherein said superheating tube panels are interspersed with said vapor generating tube panels such that substantially every sequence of two panels in said sequence of at least twenty-four panels comprises at least one superheating tube panel and at least one vapor generating tube panel.

6. A solar receiver as in claim 1 wherein each said superheating tube panel and each said vapor generating tube panel is a narrow panel.

7. A solar receiver as in claim 1 wherein each panel of said sequence of twelve panels comprises a plurality of tubes extending parallel to each other and in a plane, and a plurality of webs interconnecting said plurality of tubes into a single membrane panel.

8. A solar receiver as in claim 7 wherein said superheating tube panels are disposed outwardly of said vapor generating tube panels with respect to the pattern in which they are disposed, each of said vapor generating tube panels having at least one web extending behind at least one tube of an adjacent superheating tube panel to act as a radiation shield for the space between each vapor generating tube panel and superheating tube panel.

9. A solar receiver as in claim 1 wherein said vapor generating and superheating tube panels are distributed to form the pattern of a generally cylindrical portion having an arc of at least about 135 degrees, and at least one of said superheater tube panels and at least one of said vapor generating tube panels are located in each 45 degrees of arc of said pattern.

10. A solar receiver as in claim 1 further comprising at least one support means for maintaining panel shape, said support means disposed out of the path of solar radiation energy to the receiver.

11. A solar receiver as in claim 10 wherein said support means comprises a horizontal member rigidly attached to at least one of said vapor generating tube panels and slidingly attached to a vertical support member to permit vertical expansion and contraction of said vapor generating tube panel to which said horizontal member is attached, and said support means further comprises means extending between said horizontal member and at least one of said superheating tube panels to permit vertical expansion and contraction of said superheating tube panel to which said means extending between said horizontal member and at least one of said superheating tube panels is attached relative to said vapor generating tube panel to which said horizontal member is rigidly attached.

12. A solar receiver as in claim 10 further comprising a plurality of means for regulating vapor flow to said superheating tube panels, each said vapor flow regulating means responsive to the outlet vapor temperature of an individual one of said superheating tube panels to regulate vapor flow to said individual superheating tube panel.

13. A solar receiver as in claim 12 wherein each panel of said sequence of at least twelve panels comprises a plurality of tubes extending parallel to each other and in a plane, and a plurality of webs interconnecting said plurality of tubes into a single membrane panel.

14. A solar receiver as in claim 13 wherein said superheating tube panels are interspersed with said vapor generating tube panels over a sequence of at least twenty-four panels, and said superheating tube panels are interspersed with said vapor generating tube panels such that each sequence of three panels in said sequence of at least twenty-four panels comprises at least one superheating tube panel and at least one vapor generating tube panel.

15. A solar receiver as in claim 14 wherein each said superheating tube panel and each said vapor generating tube panel is a narrow panel.

16. A solar receiver as in claim 1 further comprising conduit means providing an east flow path and conduit means providing a west flow path for delivery of vapor to a group of superheating tube panels on the east side of the receiver and a group of superheating tube panels on the west side of the receiver respectively and means for individually controlling vapor flow into said east and west flow paths conduit means.

17. A solar receiver for receiving solar radiation energy comprising a plurality of panels of vapor generating tubes for receiving a flow of liquid to be heated to generate a vapor which generated vapor is mixed with the liquid, means for separating the vapor from the liquid, and a plurality of panels of superheating tubes for receiving a flow of the vapor to superheat the vapor, said vapor generating tube panels include outlet means flow connected to said separating means for discharging the generated vapor to said separating means, said superheating tube panels include inlet means flow connected to said separating means for receiving the generated vapor from said separating means, said vapor generating tube panels and said superheating tube panels are disposed in side-by-side relationship in the pattern of a generally cylindrical portion for receiving radiation energy from a plurality of directions, and said superheating tube panels are interspersed with said vapor generating tube panels over an arc of said generally cylindrical portion of at least 135 degees such that each 45 degree arc thereof contains at least one superheating tube panel and at least one vapor generating tube panel.

18. A solar receiver as in claim 17 wherein at least one superheating tube panel and at least one vapor generating tube panel are located in each 15 degrees of arc of said generally cylindrical pattern.

19. A solar receiver as in claim 17 further comprising a plurality of means for regulating vapor flow to said superheating tube panels, each said vapor flow regulating means responsive to the outlet vapor temperature of an individual one of said superheating tube panels to regulate vapor flow to said individual superheating tube panel.

20. A solar receiver as in claim 17 further comprising at least one support means for maintaining panel shape, said support means disposed out of the path of solar radiation energy to the receiver, said support means comprises a horizontal member rigidly attached to at least one of said vapor generating tube panels and slidingly attached to a vertical support member to permit vertical expansion and contraction of said vapor generating tube panel to which said horizontal member is attached, and said support means further comprises means extending between said horizontal member and at least one of said superheating tube panels to permit vertical expansion and contraction of said superheating tube panel to which said means extending between said horizontal member and at least one of said superheating tube panels is attached relative to said vapor generating tube panel to which said horizontal member is rigidly attached.

21. A solar receiver as in claim 17 wherein each panel of said sequence of twelve panels comprises a plurality of tubes extending parallel to each other and in a plane, and a plurality of webs interconnecting said plurality of tubes into a single membrane panel, said superheating tube panels are disposed outwardly of said vapor generating tube panels with respect to the pattern in which they are disposed, each of said vapor generating tube panels having at least one web extending behind at least one tube of an adjacent superheating tube panel to act as a radiation shield for the space between each vapor generating tube panel and superheating tube panel.

* * * * *